United States Patent
Conley et al.

(10) Patent No.: US 9,037,481 B2
(45) Date of Patent: May 19, 2015

(54) SYSTEM AND METHOD FOR INTELLIGENT CUSTOMER DATA ANALYTICS

(75) Inventors: Jessica L. Conley, Harleysville, PA (US); Anne T. Ciaralli, North Wales, PA (US); Linda F. Hibbert, Chalfont, PA (US); Thomas B. Haworth, Avon, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 343 days.

(21) Appl. No.: 13/493,167

(22) Filed: Jun. 11, 2012

(65) Prior Publication Data

US 2013/0332200 A1     Dec. 12, 2013

(51) Int. Cl.
*G06F 17/00* (2006.01)
*G06F 3/00* (2006.01)
*G06Q 40/08* (2012.01)

(52) U.S. Cl.
CPC ..................................... *G06Q 40/08* (2013.01)

(58) Field of Classification Search
None
See application file for complete search history.

(56) References Cited

U.S. PATENT DOCUMENTS

| | | | |
|---|---|---|---|
| 6,151,571 A | 11/2000 | Pertrushin | |
| 7,660,793 B2 | 2/2010 | Indeck et al. | |
| 7,668,849 B1 | 2/2010 | Narancic et al. | |
| 7,873,156 B1 | 1/2011 | Blair | |
| 7,940,914 B2 | 5/2011 | Petrushin | |
| 7,953,219 B2 | 5/2011 | Freedman et al. | |
| 8,051,086 B2 | 11/2011 | Jeffs et al. | |
| 2002/0002460 A1 | 1/2002 | Pertrushin | |
| 2002/0002464 A1 | 1/2002 | Petrushin | |
| 2002/0010587 A1 | 1/2002 | Pertrushin | |
| 2003/0149586 A1* | 8/2003 | Chen et al. | 705/1 |
| 2005/0144013 A1* | 6/2005 | Fujimoto et al. | 704/277 |
| 2006/0184410 A1 | 8/2006 | Ramamurthy et al. | |
| 2007/0061487 A1 | 3/2007 | Moore et al. | |
| 2008/0092068 A1* | 4/2008 | Norring et al. | 715/762 |
| 2010/0114899 A1 | 5/2010 | Guha et al. | |
| 2010/0274616 A1* | 10/2010 | Grace et al. | 705/9 |
| 2011/0178803 A1 | 7/2011 | Petrushin | |
| 2011/0206198 A1 | 8/2011 | Freedman et al. | |

* cited by examiner

*Primary Examiner* — Kimberly Berona
*Assistant Examiner* — Murali Dega
(74) *Attorney, Agent, or Firm* — Howard IP Law Group, PC

(57) ABSTRACT

According to some embodiments, an insurance business process may have a series of business process actions. Moreover, point of service customer interaction data associated with the insurance business process may be received along with external third-party information associated with a context of the insurance business process. Based on the external third-party data, the point of service customer interaction data may be systematically analyzed to identify a trend. The trend may be analytically mapped to a first business process action in the insurance business process. An indication of a recommended change to the first business process action may then be output based at least in part on the identified trend.

24 Claims, 8 Drawing Sheets

| INTERACTION ID 702 | DESCRIPTION 704 | DATE 706 | KEYWORD 708 | ACTION 710 | RECOMMENDATION 712 |
|---|---|---|---|---|---|
| I_101 | FULFILLMENT REQUEST | 6/6/2015 | NONE | A2 | NONE |
| I_102 | PREMIUM PAYMENT | 8/22/2015 | NONE | A2 | NONE |
| I_103 | RATE INQUIRY | 12/3/2015 | CONFUSED | A3, A4 | MERGE A3 AND A4 |
| I_104 | RENEWAL PAYMENT | 12/15/2015 | NONE | A3 | NONE |
| I_105 | RATE INQUIRY | 12/16/2015 | MAD, DUPLICATE | A3, A4 | MERGE A3 AND A4 |

*FIG. 7*

SYSTEM AND METHOD FOR INTELLIGENT CUSTOMER DATA ANALYTICS

BACKGROUND

An enterprise may establish business processes to facilitate operations, and each business process may be associated with a number of different business process actions. For example, an insurance company might establish an insurance business process to facilitate the sale and provision of insurance to members of an organization. In this case, the insurance business process might include actions associated with attracting new members, paying insurance benefits, and handling renewal payments from existing members.

Some business process actions may be associated with customer interactions, such as customer interactions at a point of service. By way of example, customer interactions at a point of service might be associated with calls to a telephone call center, submissions to a web site, emails to an organization, etc. Note that a business process action may be associated with a substantial number of individual customer interactions, such as millions of individual customer calls to a telephone call center. As a result, identifying trends with a business process and understanding consumer dynamics can be a time consuming and expensive task (e.g., because so many individual actions may need to be manually reviewed). Moreover, a customer interaction might need to be considered in view of a particular business context. For example, calls to an insurance company's telephone call center might need to be considered differently immediately after a major change to an insurance law or regulation has been enacted.

It would therefore be desirable to provide systems and methods to facilitate improvements to business processes, including insurance business processes, in an automated, efficient, and accurate manner.

SUMMARY OF THE INVENTION

According to some embodiments, systems, methods, apparatus, computer program code and means may be provided to facilitate improvements to business processes, including insurance business processes. In some embodiments, an insurance business process may have a series of business process actions. Moreover, point of service customer interaction data associated with the insurance business process may be received along with external third-party information associated with a context of the insurance business process. Based on the external third-party data, the point of service customer interaction data may be systematically analyzed to identify a trend. The trend may be analytically mapped to a first business process action in the insurance business process. An indication of a recommended change to the first business process action may then be output based at least in part on the identified trend Some embodiments provide: means for receiving point of service customer interaction data associated with the business process; means for receiving external third-party information associated with a context of the business process; based on the external third-party data, means for systematically analyzing the point of service customer interaction data to identify a trend; means for analytically mapping the trend to a first business process action in the business process; and means for outputting an indication of a recommended change to the first business process action based at least in part on the identified trend.

A technical effect of some embodiments of the invention is an improved and computerized method of providing improvements to business processes, including insurance business processes. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 7 is a tabular portion of a customer interaction database according to some embodiments.

DESCRIPTION

Figure 1:
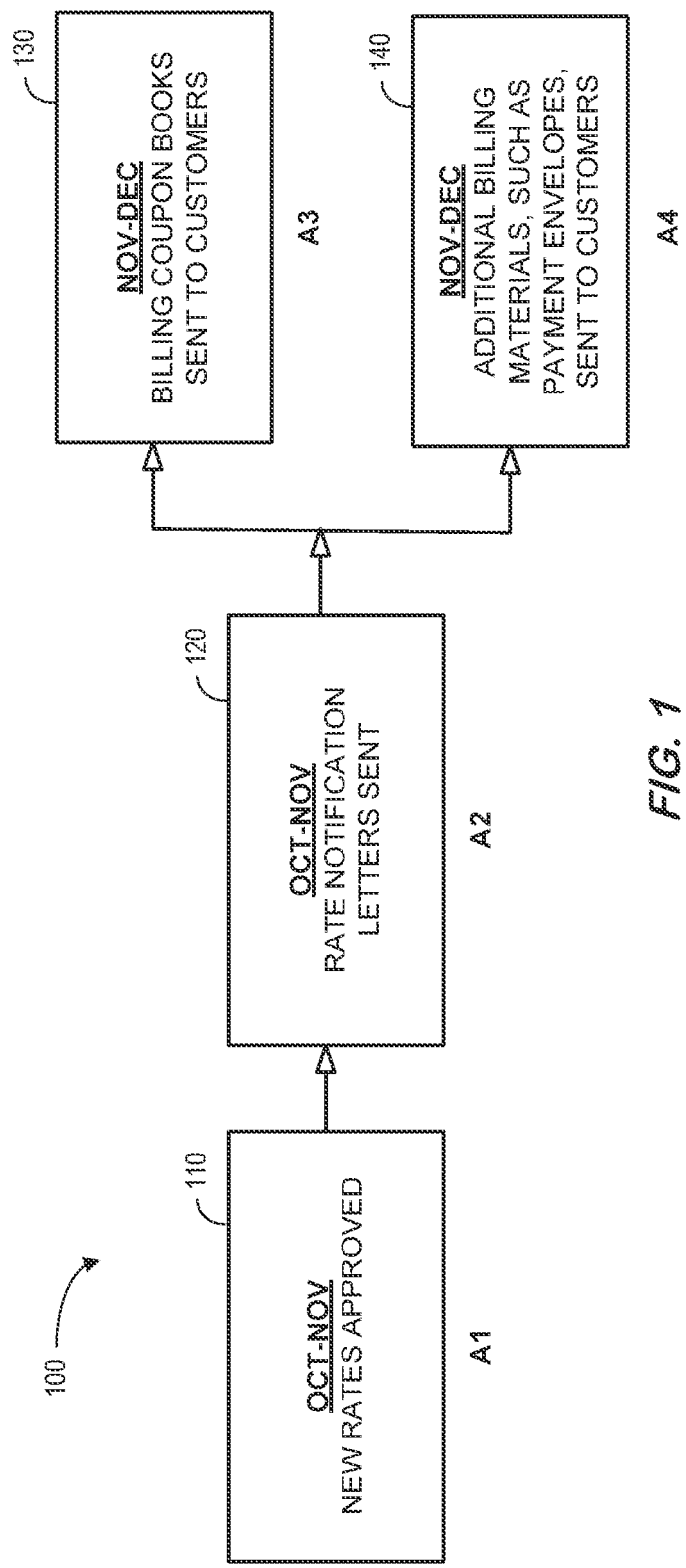
FIG. 1 is block diagram of a business process according to some embodiments of the present invention.

An enterprise may establish business processes to facilitate operations, and each business process may be associated with a number of different business process actions. For example, FIG. 1 is block diagram of a business process 100 according to some embodiments of the present invention. According to the business process 100, in October and November of a given year, a first business process step 110 ("A1") involves the approval of new rates associated with an insurance coverage program. Next, also in the October and November of a given year, a second business process step 120 ("A2") involves sending out notification letters to customers of the insurance coverage program (e.g., to educate customers about the new rates and explain when the rate changes will occur).

In November and December of a given year, a third business process step 130 ("A3") involves sending billing coupon books to customers (e.g., reflecting the new rates). A fourth business process step 140 ("A4"), also in November and December, involves sending additional billing materials to customers (e.g., payment envelopes). Although a simple business process 100 is illustrated in FIG. 1, note that actual business processes may involve many more actions, including decision branches.

Note that some business process actions in the business process 100 may be associated with customer interactions, such as customer interactions at a point of service. By way of example, in FIG. 1, business process steps A2, A3, and A4 might result in calls to a telephone call center, submissions to a web site, emails to an organization, etc. Note that these business process actions A2, A3, and A4 may be associated with a substantial number of individual customer interactions, such as hundreds of thousands of individual customer calls to a telephone call center. As a result, identifying trends with the business process 100 can be a time consuming and expensive task (e.g., because so many individual actions may need to be manually reviewed).

Moreover, a customer interaction might need to be considered in view of a particular business context. For example, calls to an insurance company's telephone call center might need to be considered differently immediately after a major change to an insurance law or regulation has been enacted.

It would therefore be desirable to provide systems and methods to facilitate improvements to business processes, including insurance business processes, in an automated, efficient, and accurate manner.

Figure 2:
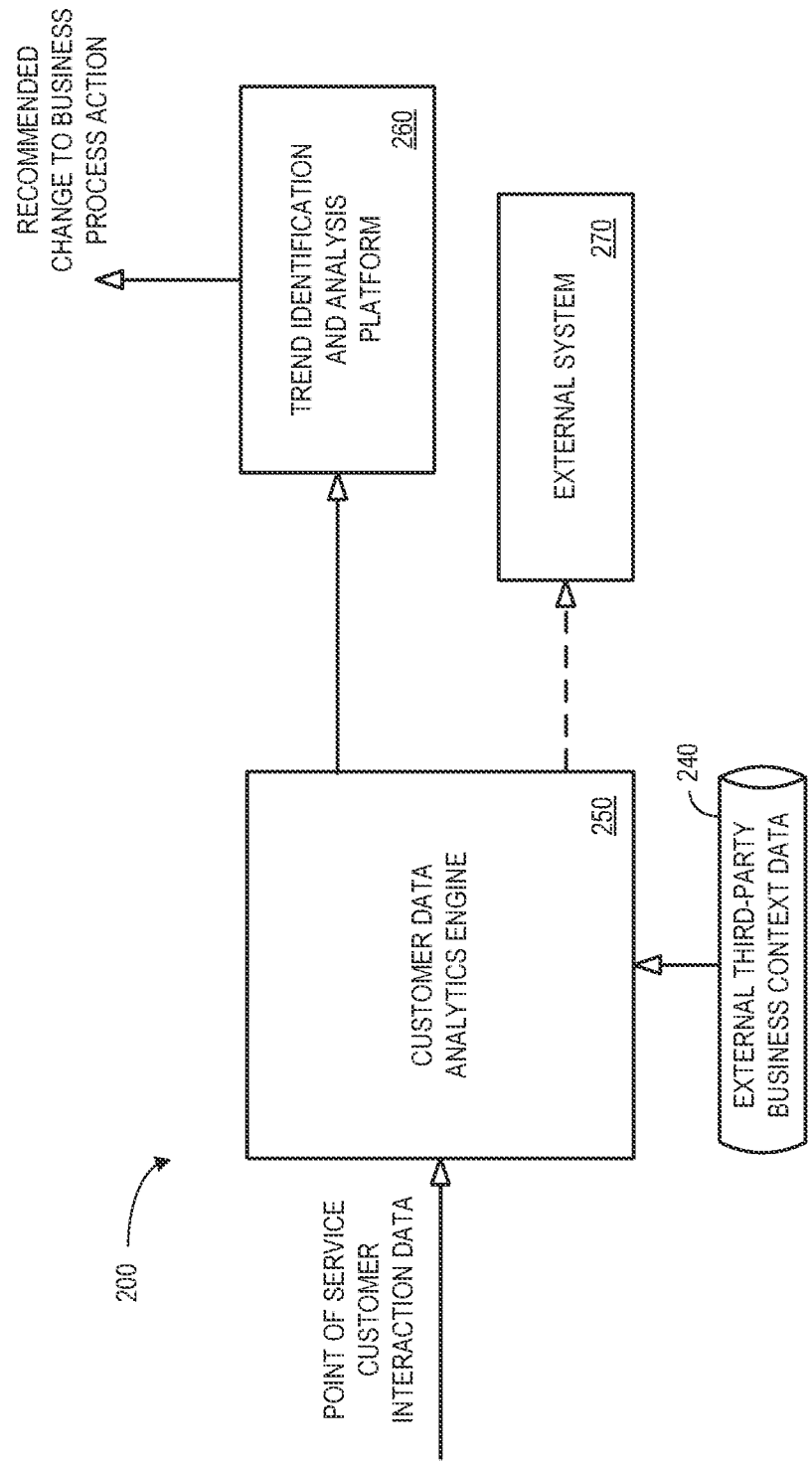
FIG. 2 is block diagram of a system according to some embodiments of the present invention.

FIG. 2 is block diagram of a system 200 according to some embodiments of the present invention. In particular, the system 200 includes a customer data analytics engine 250 that receives point of sale customer interaction data. The customer data analytics engine 250 might be, for example, associated with a Personal Computers (PC), laptop computer, an enterprise server, a server farm, and/or a database or similar storage devices. The customer data analytics engine 250 may, according to some embodiments, be associated with an organization or an insurance provider.

According to some embodiments, an "automated" customer data analytics engine 250 may facilitate improvement of a business process. As used herein, the term "automated" may refer to, for example, actions that can be performed with little or no human intervention.

As used herein, devices, including those associated with the customer data analytics engine 250 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The customer data analytics engine 250 may also access external third-party business context data 240. The external third-party business context data 240 might be associated with, for example, a news service. The external third-party business context data 240 may be locally stored or reside remote from the customer data analytics engine 250. As will be described further below, the external third-party business context data 240 may be used by the customer data analytics engine 250 to help improve a business process.

Although a single customer data analytics engine 250 is shown in FIG. 2, any number of such devices may be included. Moreover, various devices described herein might be combined according to embodiments of the present invention. For example, in some embodiments, the customer data analytics engine 250 and external third-party business context data 240 might be co-located and/or may comprise a single apparatus. According to some embodiments, the customer data analytics engine 250 receives information about point of service customer interactions and provides information to trend identification platform 260. Moreover, the customer data analytics engine 250 may output data to one or more external systems 270, such as email servers, workflow applications, etc.

Figure 3:
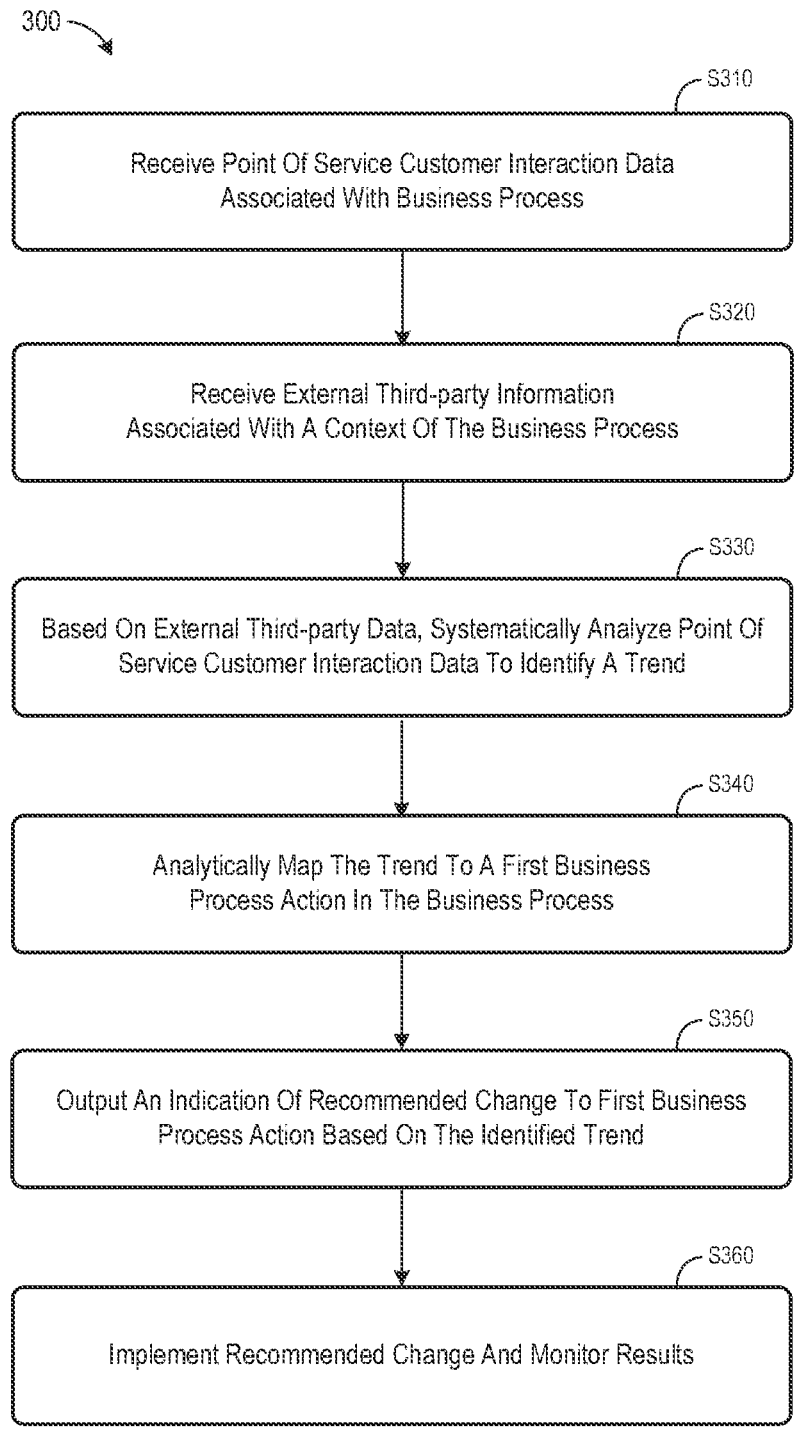
FIG. 3 illustrates a method according to some embodiments of the present invention.

FIG. 3 illustrates a method that might be performed, for example, by some or all of the elements of the system 200 described with respect to FIG. 2 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Figure 4:
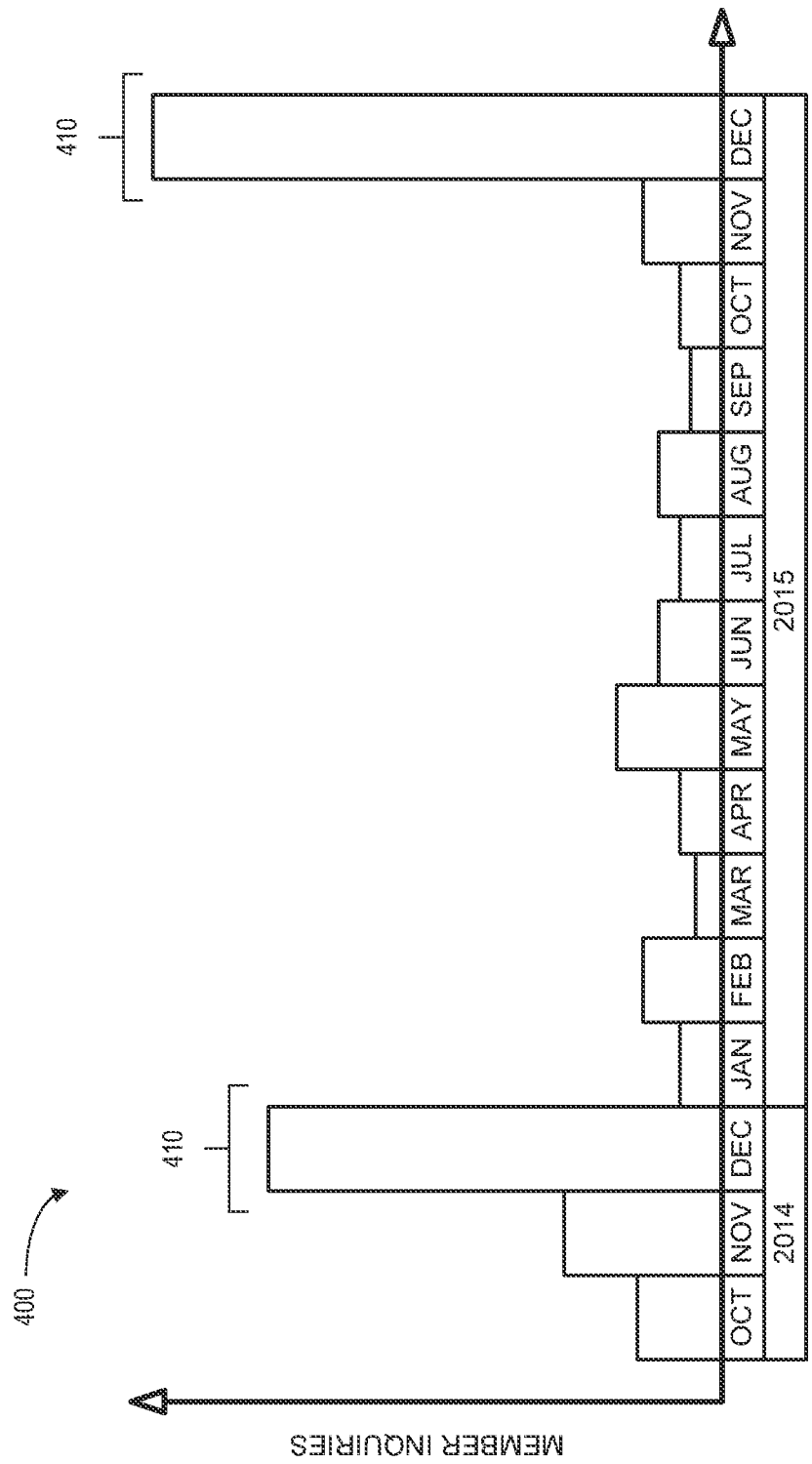
FIG. 4 illustrates member inquiries over time according to some embodiments of the present invention.

At S310, point of service customer interaction data associated with an insurance business process may be received. The point of service customer interaction data might represent, by way of example, call center customer information, such as audio customer input (e.g., a recording of his or her voice) and/or video customer input (e.g., video captured via a smartphone). Consider, for example, FIG. 4 which is a graph 400 that illustrates member inquiries over time according to some embodiments of the present invention (e.g., very few member inquiries were received in March of 2015).

As other examples, the point of service customer interaction data could represent Customer Relationship Management ("CRM") system information. As still other example, the point of service customer interaction data could comprise survey responses and/or focus group responses (e.g., where members or call center operators are interviewed).

At S320, external third-party information associated with a context of the insurance business process may be received. For example a news feed may be received from a service such as the LEXIS/NEXIS® news service. The context information may help provide a presentation of internal and external information in a consolidated way to facilitate the identification of trends and/or the generation of recommended changes.

At S330, the point of service customer interaction data may be systematically analyzed, based on the external third-party data, to identify a trend. According to some embodiments, the trend is associated with a potential problem with the insurance business process, and the recommended change comprises an adjustment to address the potential problem. Note that the trend may instead be associated with a potential opportunity connected with the insurance business process, in which case the recommended change might represent an adjustment to take advantage of the opportunity.

According to some embodiments, the automatic analysis includes searching the customer input for keywords and/or estimating an emotion associated with the customer input. For example, when the external third-party data indicates that many news reports have recently been published regarding new insurance regulations, audio recordings of customer complaint calls to an insurance provider might be systematically converted to text. The text might then be searched for keywords such as "confused" or "understand" and the emotion of the caller might be estimated based on the recordings volume, tone of voice, etc. Note that the automatic analysis performed at S330 could employee many different techniques, including trend analysis, a time series analysis, regression analysis, frequency distribution analysis, predictive modeling, descriptive modeling, data mining, text analytics, forecasting, and/or simulation. Consider the graph 400 of FIG. 4. In this case, an automatic analysis might determine that member inquiries in December 410 are unusually high as compared to other months, and these may be flagged as a trend in the business process of FIG. 1. For example, customers may be confused as to why they have received a billing coupon book but not payment envelopes.

At S340, the trend may be analytically mapped to a first business process action in the insurance business process. For example, the member inquiries in December 410 might be analytically mapped to actions A3 and A4 in FIG. 1 (because those actions are performed in December). As another example, a database might link certain types of customer interactions with particular business process actions. At S350, an indication of a recommended change to the first business process action may be automatically output based at least in part on the identified trend. For example, a report or alert might be output to an administrator indicating that a particular business process action should be modified, deleted, merged, split, etc. At S360, the recommended change might be implemented and results may be monitored (e.g., to determine whether or not the change to the business process has the anticipated effect).

According to some embodiments, future point of service customer interaction data may be systematically analyzed. For example, falling customer satisfaction survey results might lead to a recommendation that a particular business process action be deleted. In this case, survey results after the deletion of that business process action might be monitored. Moreover, based on the future point of service customer interaction data, it may be automatically determined if the trend has been addressed by the recommended change to the first business process action (e.g., survey results improved after the business process action was deleted by an enterprise).

Figure 5:
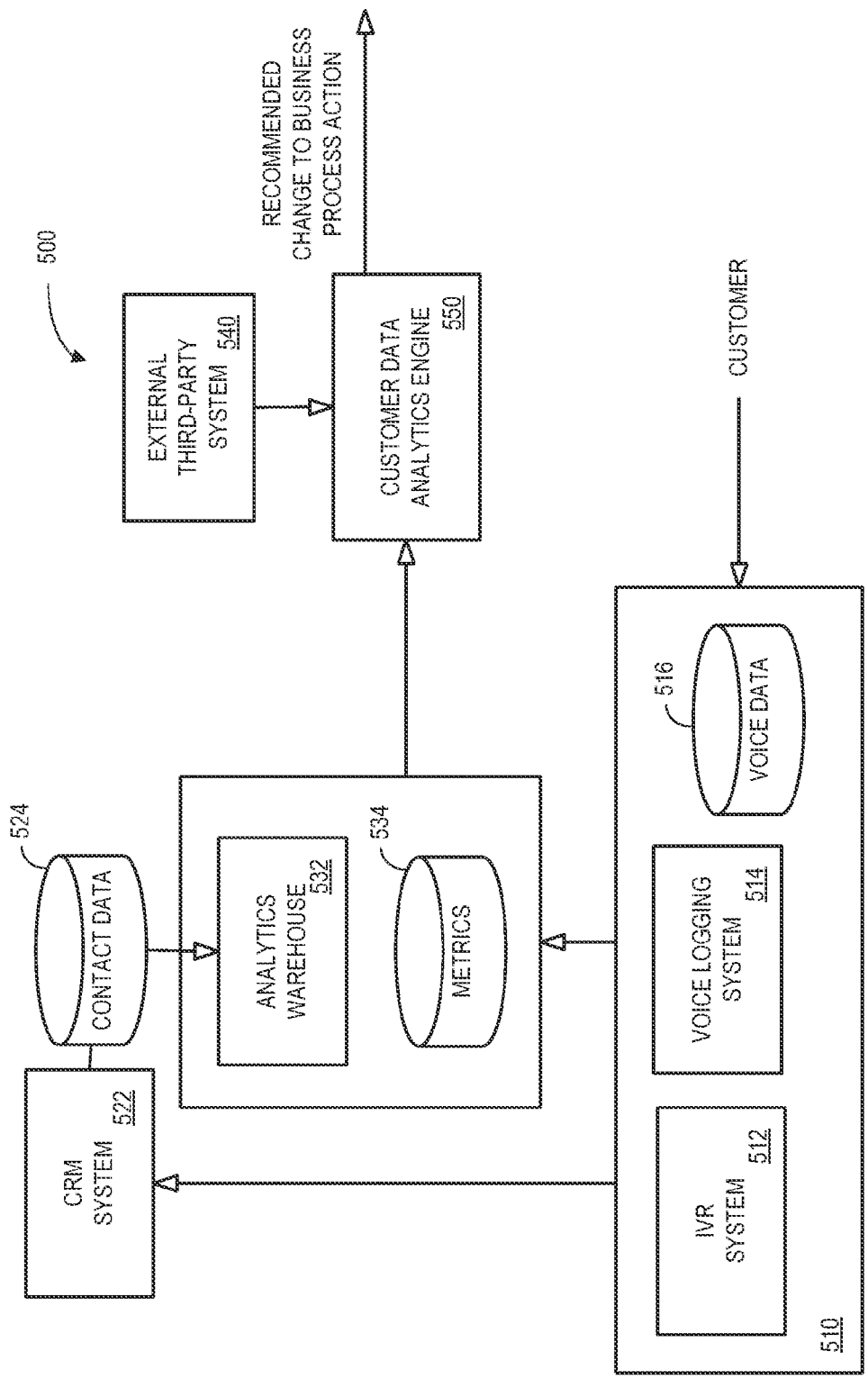
FIG. 5 is block diagram of a system according to some embodiments of the present invention.

FIG. 5 is block diagram of a system 500 according to some embodiments of the present invention. In particular, the system 500 includes a call center 510 that may interact with customers (e.g., by received customer telephone calls). The call center 510 includes an Interactive Voice Response ("IVR") system 512, such as the one available from GENESYS®, which may provide self-service options for customers through the phone channel. The call center further includes a voice logging system 514, such as the NICE PERFORM SYSTEM® available from NICE SYSTEMS, LTD., which might record call center phone calls in a database of voice data 516, support internal quality monitoring processes, and use a voice analytics module to provided additional insight about recorded call center conversations.

Information from the call center 510 may be provided to a CRM system 522, such as an ORACLE SIEBEL® CRM System that includes contact data 524 (e.g., time and date of a call, member's home address and telephone number, the reason for the call, etc.). An analytics warehouse 532 and operational metrics database 534 may receive information from both the call center 510 and the contact data 524. The analytics warehouse 532 might be associated with, for example, an ORACLE SIEBEL® analytics warehouse that consolidates operations data from applications to enable metrics reporting and Key Performance Indicator ("KPI") dashboards.

Information from the analytics warehouse 532 may be provided to a customer data analytics engine 550 that also receives data from an external third-party system (e.g., business context information). The customer data analytics engine 550 might be associated with, for example, the SAS tool available from SAS, INC.® that provides an integrated environment for predictive and descriptive modeling, data mining, text analytics, forecasting, optimization, and simulation capabilities. The customer data analytics engine 550 may then transmit or output a recommended change to a business process action in accordance with any of the embodiments described herein.

Figure 6:
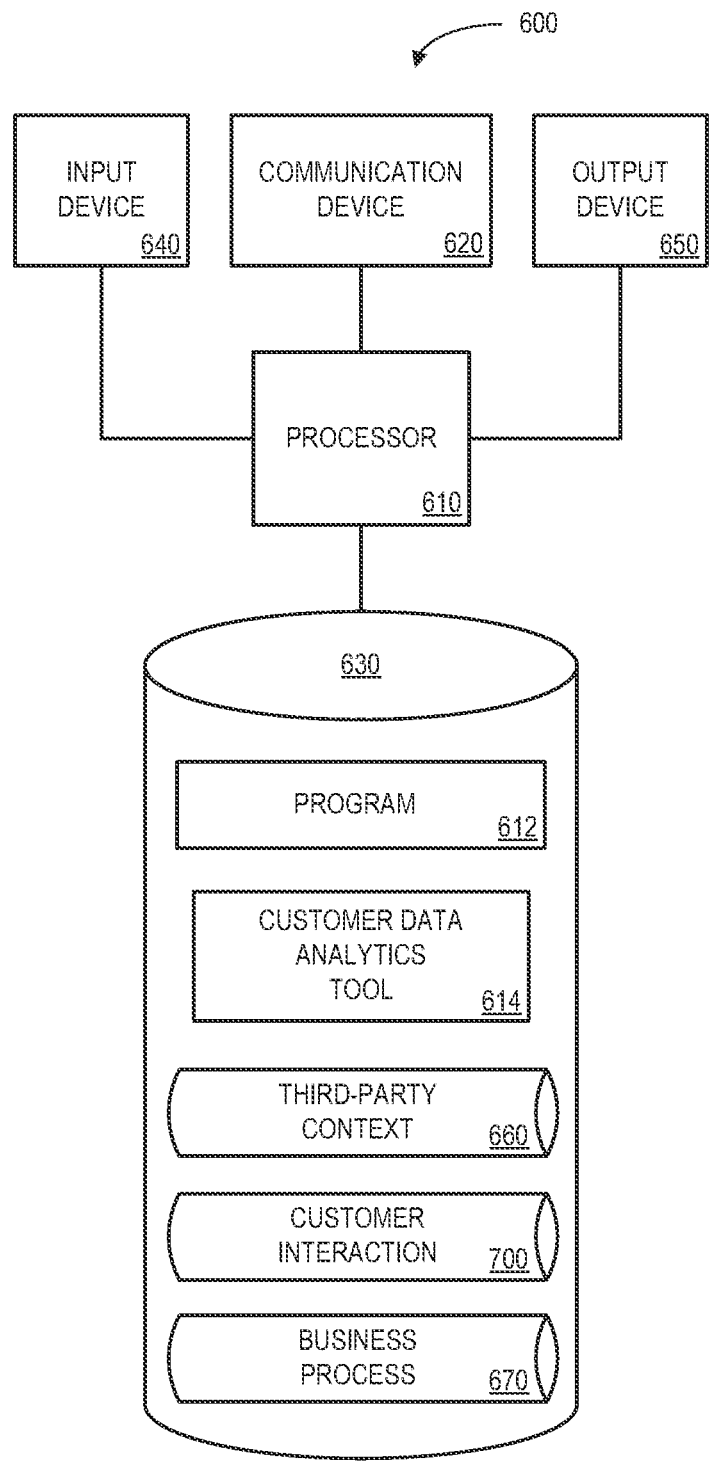
FIG. 6 is block diagram of a customer data analytics engine according to some embodiments of the present invention.

The embodiments described herein may be implemented using any number of different hardware configurations. For example, FIG. 6 illustrates a customer data analytics engine 600 that may be, for example, associated with either of the systems 200, 500 of FIG. 2 or 5, respectively. The customer data analytics engine 600 comprises a processor 610, such as one or more commercially available Central Processing Units (CPUs) in the form of one-chip microprocessors, coupled to a communication device 620 configured to communicate via a communication network (not shown in FIG. 6). The communication device 620 may be used to communicate, for example, with one or more remote devices or third-party data services. The customer data analytics engine 600 further includes an input device 640 (e.g., a mouse and/or keyboard to enter business process information) and an output device 650 (e.g., a computer monitor to display recommendations to an operator or administrator).

The processor 610 also communicates with a storage device 630. The storage device 630 may comprise any appropriate information storage device, including combinations of magnetic storage devices (e.g., a hard disk drive), optical storage devices, mobile telephones, vehicle computers, and/or semiconductor memory devices. The storage device 630 stores a program 612 and/or a customer analytics tool 614 (e.g., an interactive application) for controlling the processor 610. The processor 610 performs instructions of the programs 612, 614, and thereby operates in accordance with any of the embodiments described herein. For example, point of service customer interaction data associated with the insurance business process may be received by the processor 610 along with external third-party information associated with a context of the insurance business process. Based on the external third-party data, the point of service customer interaction data may be systematically analyzed by the processor 610 to identify a trend. The trend may be analytically mapped to a first business process action in the insurance business process. An indication of a recommended change to the first business process action may then be output by the processor 610 based at least in part on the identified trend.

The programs 612, 614 may be stored in a compressed, uncompiled and/or encrypted format. The programs 612, 614 may furthermore include other program elements, such as an operating system, a database management system, and/or device drivers used by the processor 610 to interface with peripheral devices.

As used herein, information may be "received" by or "transmitted" to, for example: (i) the customer data analytics engine 600 from another device; or (ii) a software application or module within the customer data analytics engine 600 from another software application, module, or any other source.

In some embodiments (such as shown in FIG. 6), the storage device 630 stores a third-party context database 760, a customer interaction database 800, and a business process database 700. An example of a database that may be used in connection with the customer data analytics engine 600 will now be described in detail with respect to FIG. 7. Note that the database described herein is only one example, and additional and/or different information may be stored therein. Moreover, various databases might be split or combined in accordance with any of the embodiments described herein.

Referring to FIG. 7, a table is shown that represents the customer interaction database 800 that may be stored at the customer data analytics engine 600 according to some embodiments. The table may include, for example, entries identifying interactions with customers (e.g., phone calls, emails, etc.). The table may also define fields 702, 704, 706, 708, 710, 712 for each of the entries. The fields 702, 704, 706, 708, 710 may, according to some embodiments, specify: an interaction identifier 702, a description 704, a date 706, one or more keywords 708, an action 710, and a recommendation 712. The information in the customer interaction database 700 may be created and updated, for example, whenever data is analyzed and/or new interactions occur.

The interaction identifier 702 may be, for example, a unique alphanumeric code identifying an interaction with a customer or potential customer (e.g., a person or business). The description 704 may describe the interaction (e.g., was a received telephone call a complaint, a request to become a new member, or a renewal payment) and the date 706 may indicate when the interaction occurred. The keywords 708 might indicate words or phrases that were detected in connection with the interaction. The action 710 might represent one or more business process steps that associated with the interaction (e.g., interaction "I_105" of FIG. 7 is associated with business process actions A3 and A4 of FIG. 1 because the interaction occurred in December as defined by the date 706).

The recommendation 712 may indicate changes that should be made to the associated business process actions 710 (e.g., by merging business process actions A3 and A4 in FIG. 1). That is, customers might be confused rate change notifications are mailed separately from premium payment envelopes. As a result, member inquiries increase and the system may recommend merging those two actions into a single mailing to improve the business process.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Applicants have discovered that embodiments described herein may be particularly useful in connection with supporting point of service customer interactions and systems. Note, however, that other types of interactions may also benefit from the invention. For example, embodiments of the present invention may be used in connection with other customer experiences and industries.

Figure 8:
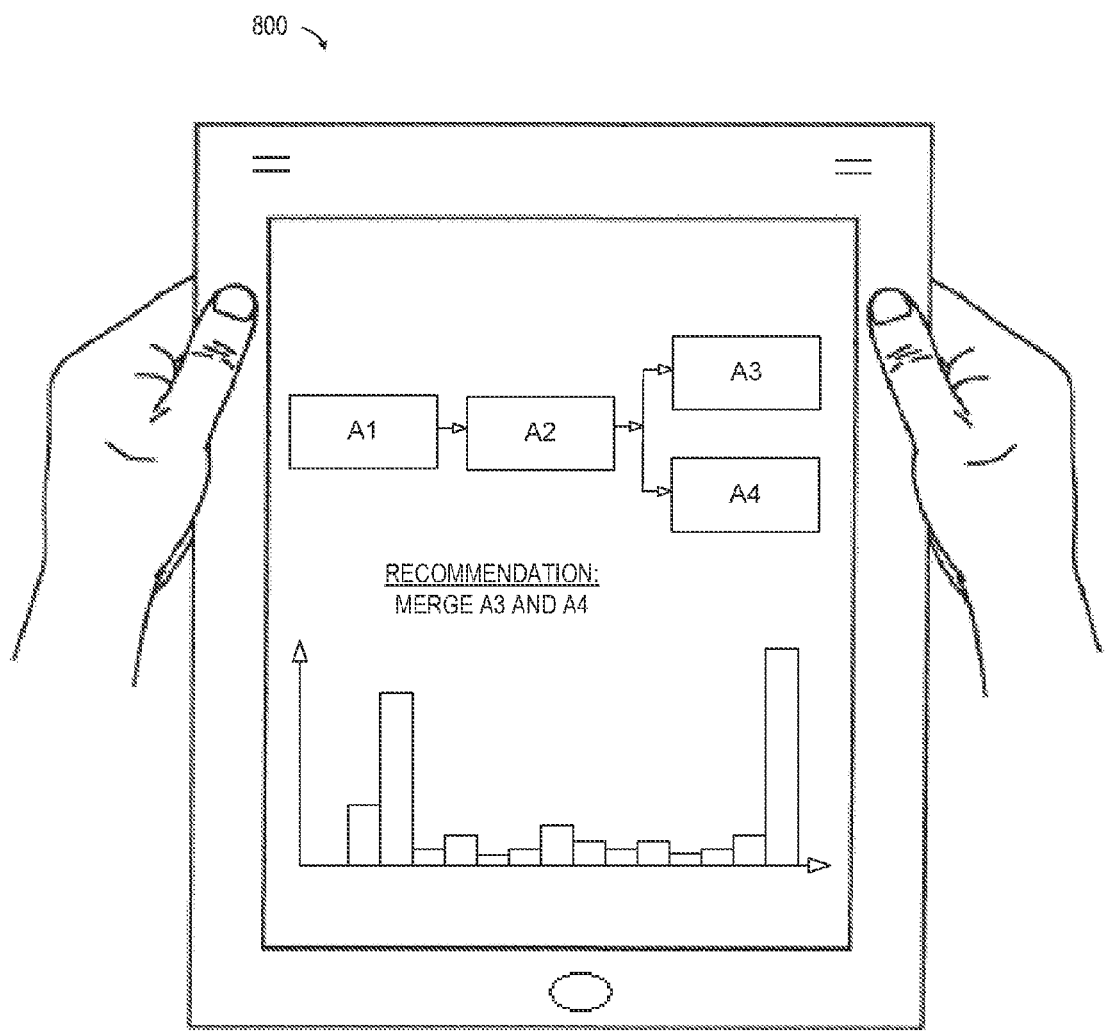
FIG. 8 illustrates a display in accordance with some embodiments described herein.

Moreover, some embodiments have been described herein as being accessed via a PC or laptop computer. Note, however, that embodiments may be implemented using any device capable of executing the disclosed functions and steps. For example, FIG. 8 illustrates a display 800 in accordance with some embodiments described herein. In particular, the display includes a graphical user interface including information about a business process, customer interactions, and/or recommendations made to address trends.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system for systematically analyzing point of service customer interaction data, identifying a trend indicative of a relationship between a business context event and the point of service customer interaction data, mapping the trend to a business process action, and outputting a recommended change in the business process action based on the identified trend, comprising:

a communication device to receive: (i) point of service customer interaction data associated with the insurance business process action and (ii) external third-party data of business context events that may affect a quantity or type of the point of service customer service interactions associated with the insurance business process action;

a computer processor for executing program instructions; and a memory, coupled to the computer processor, storing program instructions which, when executed by the computer processor cause the processor to:

systematically analyze, based on the external third-party data, the point of service customer interaction data to identify a trend indicative of a relationship between a particular business context event of the external third-party data and the quantity or type of the point of service customer service interactions associated with the insurance business process action, analytically map the trend to the business process action of the series of business process actions, and output an indication of a recommended change to the business process action based at least in part on the identified trend.

2. The system of claim 1, wherein the point of service customer interaction data comprises call center customer information.

3. The system of claim 2, wherein the call center customer information includes at least one of: (i) audio customer input, and (ii) video customer input.

4. The system of claim 3, wherein said program instructions in said memory, when executed by the computer processor, further cause the processor to systematically analyze the point of service customer interaction data includes program instructions to search the customer input for keywords.

5. The system of claim 3, wherein said program instructions in said memory, when executed by the computer processor, further cause the processor to systematically analyze the point of service customer interaction data includes program instructions to estimate an emotion associated with a volume, a tone, or keywords of the customer input.

6. The system of claim 1, wherein the trend is associated with a potential problem with the insurance business process action and the recommended change comprises an adjustment to address the potential problem.

7. The system of claim 1, wherein the point of service customer interaction data comprises customer relationship management system information.

8. The system of claim 1, wherein the point of service customer interaction data comprises at least one of: (i) survey responses, and (ii) focus group responses.

9. The system of claim 1, wherein said systematic analysis includes at least one of: (i) a trend analysis, (ii) a time series analysis, (iii) a regression analysis, (iv) a frequency distribution analysis, (v) predictive modeling, (vi) descriptive modeling, (vii) data mining, (viii) text analytics, (ix) forecasting, and (x) simulation.

10. The system of claim 1, wherein the memory further stores program instructions which, when executed by the computer processor cause the processor to:

systematically analyze future point of service customer interaction data, and based on the future point of service customer interaction data, systematically determining if the trend has been addressed by the recommended change to the business process action.

11. A computer-implemented method for systematically analyzing point of service customer interaction data, identifying a trend indicative of a relationship between a business context event and the point of service customer interaction data, mapping the trend to a business process action, and outputting a recommended change in the business process action based on the identified trend, comprising:

receiving by a communication device point of service customer interaction data associated with the business process action;

receiving by the communication device external third-party data of business context events that may be affecting a quantity or type of the point of service customer interactions associated with the business process action;

based on the external third-party data, systematically analyzing, by a processor, the point of service customer interaction data to identify a trend indicative of a relationship between a particular business context event of the external third-party data and the quantity or type of the point of service customer service interactions associated with the insurance business process action;

analytically mapping, by the processor, the trend to a business process action of the series of business process actions in the business process; and outputting, by the processor, an indication of a recommended change to the business process action based at least in part on the identified trend.

12. The method of claim 11, wherein the point of service customer interaction data comprises call center customer information including at least one of: (i) audio customer input, and (ii) video customer input.

13. The method of claim 12, wherein said automatic analysis includes searching the customer input for keywords.

14. The method of claim 12, wherein said automatic analysis includes estimating an emotion associated with a volume, a tone, or keywords of the customer input.

15. The method of claim 11, wherein the point of service customer interaction data comprises at least one of: (i) customer relationship management system information, (ii) survey responses, and (iii) focus group responses.

16. The method of claim 11, wherein said automatic analysis includes at least one of: (i) a trend analysis, (ii) a time series analysis, (iii) a regression analysis, (iv) a frequency distribution analysis, (v) predictive modeling, (vi) descriptive modeling, (vii) data mining, (viii) text analytics, (ix) forecasting, and (x) simulation.

17. The method of claim 11, further comprising:
systematically analyzing future point of service customer interaction data; and
based on the future point of service customer interaction data, automatically determining if the trend has been addressed by the recommended change to the business process action.

18. A non-transitory computer-readable medium storing instructions adapted to be executed by a computer processor to perform a method for systematically analyzing point of service customer interaction data, identifying a trend indicative of a relationship between a business context event and the point of service customer interaction data, mapping the trend to a business process action, and outputting a recommended change in the business process action based on the identified trend, said method comprising:

receiving point of service customer interaction data associated with the business process action;

receiving external third-party data of business context events that may affect a quantity or type of the point of service customer interactions associated with the business process action;

based on the external third-party data, systematically analyzing the point of service customer interaction data to identify a trend indicative of a relationship between a particular business context event of the external third-party data and the quantity or type of the point of service customer service interactions associated with the insurance business process action;

analytically mapping the trend to a business process action of the series of business process actions in the business process; and outputting an indication of a recommended change to the business process action based at least in part on the identified trend.

19. The medium of claim 18, wherein the point of service customer interaction data comprises call center customer information including at least one of: (i) audio customer input, and (ii) video customer input.

20. The medium of claim 19, wherein said automatic analysis includes searching the customer input for keywords.

21. The medium of claim 19, wherein said automatic analysis includes estimating an emotion associated with a volume, a tone, or keywords of the customer input.

22. The medium of claim 18, wherein the point of service customer interaction data comprises at least one of: (i) customer relationship management system information, (ii) survey responses, and (iii) focus group responses.

23. The medium of claim 18, wherein said automatic analysis includes at least one of: (i) a trend analysis, (ii) a time series analysis, (iii) a regression analysis, (iv) a frequency distribution analysis, (v) predictive modeling, (vi) descriptive modeling, (vii) data mining, (viii) text analytics, (ix) forecasting, and (x) simulation.

24. The medium of claim 18, further comprising:
systematically analyzing future point of service customer interaction data; and
based on the future point of service customer interaction data, automatically determining if the trend has been addressed by the recommended change to the business process action.

* * * * *